(12) United States Patent
Lee

(10) Patent No.: US 6,972,952 B2
(45) Date of Patent: Dec. 6, 2005

(54) COMPUTER SYSTEM AND CONTROL METHOD THEREOF

(75) Inventor: Jae-soon Lee, Suwon (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 49 days.

(21) Appl. No.: 10/678,077

(22) Filed: Oct. 6, 2003

(65) Prior Publication Data

US 2004/0139256 A1   Jul. 15, 2004

(30) Foreign Application Priority Data

Jan. 15, 2003  (KR) ...................... 10-2003-0002783

(51) Int. Cl.[7] ................................................ G06F 1/20
(52) U.S. Cl. ........................ 361/687; 702/132; 700/29
(58) Field of Search ................................. 361/679–687, 361/724–727; 702/130, 132, 134, 300, 320, 702/322; 700/29, 46, 299, 300; 165/80.3

(56) References Cited

U.S. PATENT DOCUMENTS

| | | | |
|---|---|---|---|
| 6,101,610 A | 8/2000 | Beebe et al. ................. | 713/324 |
| 6,470,289 B1 | 10/2002 | Peters et al. ................. | 702/132 |
| 6,510,400 B1 * | 1/2003 | Moriyama ................... | 702/132 |
| 6,593,673 B1 * | 7/2003 | Sugai et al. ................. | 307/116 |
| 6,760,649 B2 * | 7/2004 | Cohen ......................... | 700/299 |
| 2002/0020755 A1 * | 2/2002 | Matsushita ................. | 236/49.3 |

FOREIGN PATENT DOCUMENTS

| | | |
|---|---|---|
| JP | 11-161378 | 6/1999 |
| JP | 11-167434 | 6/1999 |
| JP | 2000-284862 | 10/2000 |
| JP | 2002-6991 | 1/2002 |

* cited by examiner

Primary Examiner—Hung Van Duong
(74) Attorney, Agent, or Firm—Staas & Halsey LLP

(57) ABSTRACT

A computer system and a control method thereof allowing one of a power control circuit thereof and a CPU cooling part thereof to selectively use information of an internal temperature of a CPU that is detected by a temperature sensor.

25 Claims, 5 Drawing Sheets

COMPUTER SYSTEM AND CONTROL METHOD THEREOF

CROSS-REFERENCE TO RELATED APPLICATIONS

This application claims the benefit of Korean Patent Application No. 2003-2783, filed on Jan. 15, 2003, in the Korean Intellectual Property Office, the disclosure of which is incorporated herein by reference.

BACKGROUND OF THE INVENTION

1. Field of the Invention

The present invention relates to a computer system and a control method thereof, and, more particularly, to a computer system and a control method thereof allowing one of a power control circuit thereof and a CPU cooling part thereof to selectively use information of an internal temperature of a CPU detected by a temperature sensor.

2. Description of the Related Art

Recently, to improve efficiency of a computer, a chip thereof has been more and more highly integrated with the higher clock speed. However, the higher the clock speed is increased, the more heat is generated in a CPU. Thus, an internal temperature of the CPU is increased, which can cause misoperation or breakdown of the CPU.

Various methods have been invented to prevent the misoperation and the breakdown of the CPU by the increase of the internal temperature thereof. For example, there has been proposed a method of cutting off power supplied to a computer in the case that the internal temperature of a CPU exceeds a predetermined reference temperature, and a method of cooling a CPU by driving a cooling fan during the use of a computer by installing the cooling fan near the CPU.

As the method of cutting off power supplied to a computer in the case that the internal temperature of the CPU exceeds the predetermined reference temperature, there has been proposed a method of embedding a power cut-off circuit in the CPU itself in the case that the internal temperature of the CPU exceeds the predetermined reference temperature, and a separate method of providing a temperature sensor detecting the internal temperature of the CPU and a power control circuit cutting off power supplied to the CPU if temperature detected by the temperature sensor exceeds a predetermined temperature. Therein, the temperature sensor of the latter method comprises a thermal diode, wherein a resistance of the thermal diode is varied according to the internal temperature of the CPU. Thus, different voltages are generated and outputted from the temperature sensor according to change of the internal temperature of the CPU, so that information of the internal temperature of the CPU can be transmitted to a power control circuit. The power control circuit cuts off power of a power supply part when the power control circuit determines that the internal temperature of the CPU exceeds the predetermined temperature by monitoring the information of the internal temperature of the CPU.

In the method of cooling the CPU by using the cooling fan, a method controlling a rotation speed of the cooling fan has been variously proposed. For example, disclosed is a method of maintaining a constant rotation speed of the cooling fan. Also, disclosed is a method of controlling a cooling of the CPU by providing a CPU cooling part cooling the CPU on the basis of the information of the internal temperature of the CPU detected by the temperature sensor.

In a conventional computer, the power control circuit cutting off power and a fan driving controller controlling the rotation speed of a fan driving part have different power levels from each other, wherein the power levels are used to receive the information of the internal temperature of the CPU from the temperature sensor. Thus, the information of the internal temperature of the CPU detected by the temperature sensor cannot be used in both of the control units together. Accordingly, there is a problem that controls of power cut-off and the cooling fan cannot be implemented by only one system.

SUMMARY OF THE INVENTION

Accordingly, it is an aspect of the present invention to provide a computer system and a control method thereof allowing one of a power control circuit thereof and a CPU cooling part thereof to selectively use information of an internal temperature of a CPU detected by a temperature sensor.

Additional aspects and/or advantages of the present invention will be set forth in part in the description that follows and, in part, will be obvious from the description, or may be learned by practicing the present invention.

The foregoing and/or other aspects of the present invention are achieved by providing a computer system having a CPU, a BIOS ROM to store a BIOS to perform a POST, and a power supply part to supply power to the CPU and the BIOS ROM, comprising: a temperature sensor to detect an internal temperature of the CPU; a power control circuit to cut off the power supplied from the power supply part when the internal temperature of the CPU detected by the temperature sensor exceeds a predetermined monitoring reference temperature; a CPU cooling part to cool the CPU according to the internal temperature of the CPU detected by the temperature sensor; and a selection part to selectively connect the temperature sensor to one of the power control circuit and the CPU cooling part, wherein the temperature sensor is connected to the power control circuit in an initial power supply, and wherein the BIOS that is stored in the BIOS ROM controls the selection part so that the temperature sensor can be connected to the CPU cooling part during the performing of the POST.

In an aspect, the power control circuit comprises: a monitoring circuit to generate a predetermined power controlling signal when the internal temperature of the CPU that is detected by the temperature sensor exceeds the predetermined monitoring reference temperature; and a power cut-off circuit to cut off the power of the power supply part when the predetermined power controlling signal is inputted from the monitoring circuit.

In an aspect, the selection part comprises: a first switching circuit to be turned on/off so that the temperature sensor and the power control circuit can be connected and/or disconnected; a second switching circuit to be turned on/off so that the temperature sensor and the CPU cooling part can be connected and/or disconnected; and a switching control circuit to selectively turn on one of the first switching circuit and the second switching circuit.

In an aspect, the switching control circuit turns on the first switching circuit and turns off the second switching circuit so that the temperature sensor can be connected to the power control circuit when power is initially supplied.

In an aspect, the BIOS that is stored in the BIOS ROM controls the switching control circuit so that the first switching circuit can be turned off and the second switching circuit can be turned on, to thereby allow the temperature sensor and the CPU cooling part to be connected to each other during the POST.

In an aspect, the CPU cooling part comprises: a cooling fan to cool the CPU; a fan driving part to drive the cooling fan; and a fan driving controller to control the fan driving part according to the internal temperature of the CPU that is detected by the temperature sensor.

In an aspect, the fan driving controller comprises an I/O controller to control an input/output of the computer system.

In an aspect, when the second switching circuit is on, the I/O controller controls the power cut-off circuit to cut off the power supplied from the power supply part when it is analyzed that the internal temperature of the CPU detected by the temperature sensor exceeds a predetermined BIOS reference temperature.

In an aspect, information of the predetermined BIOS reference temperature is stored in the BIOS ROM.

In an aspect, the BIOS that is stored in the BIOS ROM controls the switching control circuit so that the first switching circuit can be turned off and the second switching circuit can be turned on, to thereby allow the temperature sensor and the CPU cooling part to be connected to each other when the POST is ended.

The foregoing and/or other aspects of the present invention are also achieved by providing a control method of a computer system having a CPU, a BIOS ROM storing a BIOS to perform a POST, a power supply part supplying power to the CPU and the BIOS ROM, a power control circuit to cut off the power supplied from the power supply part, and a CPU cooling part cooling the CPU, comprising: detecting an internal temperature of the CPU; inputting information of the internal temperature of the CPU to the power control circuit in an initial power supply; and cutting off the information of the internal temperature of the CPU inputted to the power control circuit, and inputting the information of the internal temperature of the CPU to the CPU cooling part.

In an aspect, inputting the information of the internal temperature of the CPU to the power control circuit comprises: allowing the power control circuit to cut off the power supplied from the power supply part when the internal temperature of the CPU exceeds a predetermined monitoring reference temperature.

In an aspect, the cutting off the information of the internal temperature of the CPU inputted to the power control circuit, and the inputting the information of the internal temperature of the CPU to the CPU cooling part are performed when the POST is ended.

In an aspect, the power control circuit comprises a monitoring circuit generating a predetermined power controlling signal when the internal temperature of the CPU detected by the temperature sensor exceeds the predetermined monitoring reference temperature, and a power cut-off circuit to cut off the power from the power supply part when the power controlling signal is inputted from the monitoring circuit, and wherein the CPU cooling part comprises a cooling fan cooling the CPU, a fan driving part driving the cooling fan, and a fan driving controller controlling the fan driving part according to a detected internal temperature of the CPU, the control method further comprising: allowing the fan driving controller to control the power cut-off circuit to cut off the power supplied from the power supply part when the detected internal temperature of the CPU exceeds a predetermined BIOS reference temperature after information of the detected internal temperature of the CPU is inputted to the CPU cooling part.

In an aspect, the predetermined BIOS reference temperature is stored in the BIOS ROM.

The foregoing and/or other aspects of the present invention are also achieved by providing a computer system having a CPU, a BIOS ROM to store a BIOS to perform a POST, and a power supply part to supply power to the CPU and the BIOS ROM, comprising: a temperature sensor to detect an internal temperature of the CPU; a power control circuit to cut off the power supplied from the power supply part when the internal temperature of the CPU that is detected by the temperature sensor exceeds a predetermined monitoring reference temperature; a CPU cooling part to cool the CPU according to the internal temperature of the CPU that is detected by the temperature sensor; and a selection part to selectively connect the temperature sensor to one of the power control circuit and the CPU cooling part.

In an aspect, the power control circuit comprises: a monitoring circuit to generate a predetermined power controlling signal when the internal temperature of the CPU that is detected by the temperature sensor exceeds the predetermined monitoring reference temperature; and a power cut-off circuit to cut off the power from the power supply part when the predetermined power controlling signal is inputted from the monitoring circuit.

In an aspect, the selection part comprises: a first switching circuit to be turned on/off so that the temperature sensor and the power control circuit can be connected and/or disconnected; a second switching circuit to be turned on/off so that the temperature sensor and the CPU cooling part can be connected and/or disconnected; and a switching control circuit to selectively turn on one of the first switching circuit and the second switching circuit.

In an aspect, the switching control circuit turns on the first switching circuit and turns off the second switching circuit so that the temperature sensor can be connected to the power control circuit when power is initially supplied.

In an aspect, the BIOS stored in the BIOS ROM controls the switching control circuit so that the first switching circuit can be turned off and the second switching circuit can be turned on, to thereby allow the temperature sensor and the CPU cooling part to be connected to each other during performing the POST.

BRIEF DESCRIPTION OF THE DRAWINGS

These and other aspects and/or advantages of the present invention will become apparent and more readily appreciated from the following description of the embodiments, taken in conjunction with the accompany drawings of which.

DETAILED DESCRIPTION OF THE PREFERRED EMBODIMENTS

Figure 1:
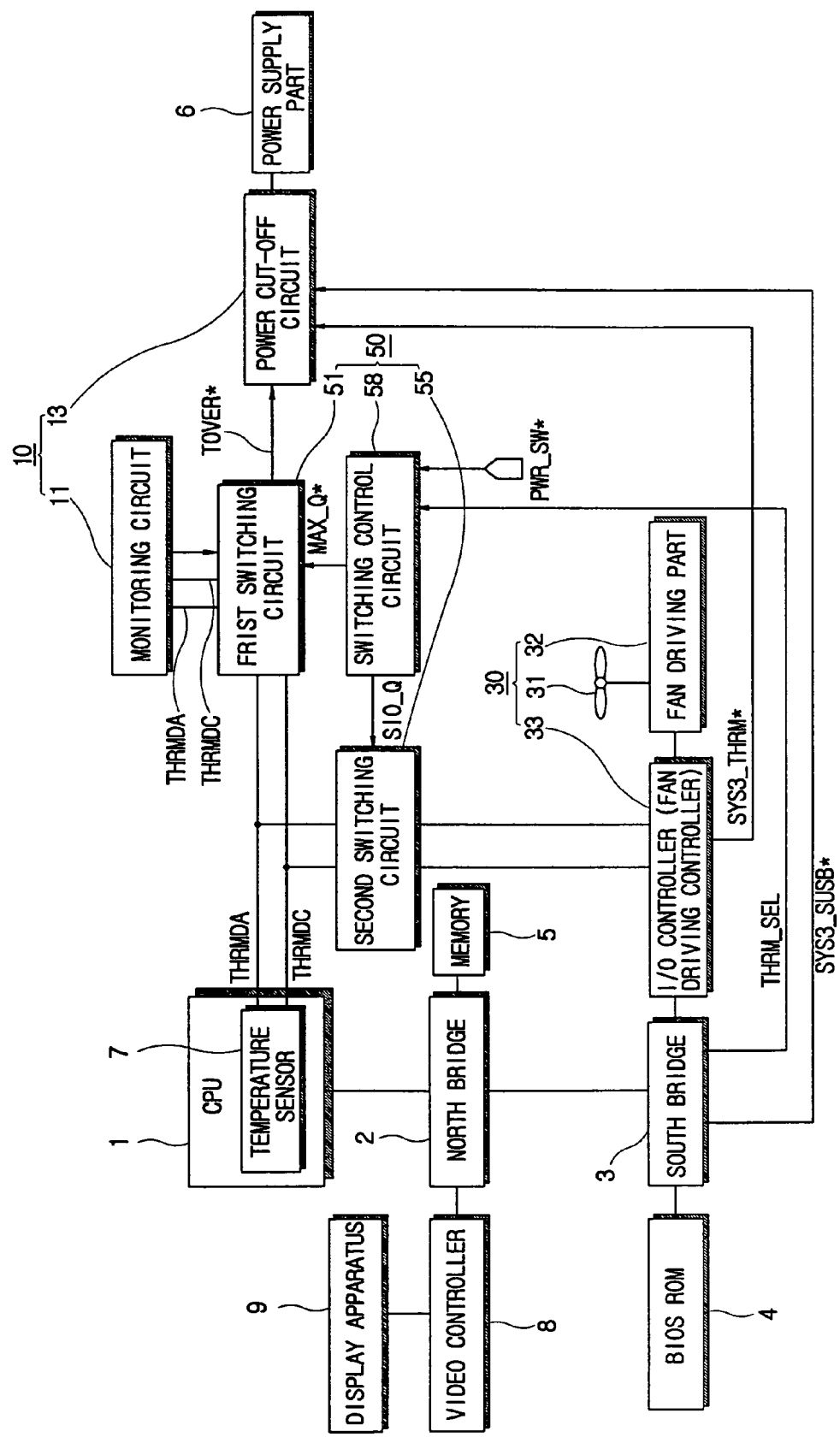
FIG. 1 is a control block diagram of a computer system according to the present invention.

Reference will now be made in detail to the embodiments of the present invention, examples of which are illustrated in the accompanying drawings, wherein like reference numerals refer to like elements throughout. The embodiments are described below in order to explain the present invention by referring to the figures.

A computer according to the present invention, as shown in FIG. 1, comprises a CPU 1, a memory 5, an input part (not illustrated), an output part (not illustrated), and a power supply part 6 supplying external power to respective structural elements including the CPU 1. Also, a north bridge 2 manages data transferring between the CPU 1, the memory 5, and a video controller 8. A south bridge 3 is a chipset managing overall devices not managed by the north bridge 2. Generally, the south bridge 3 controls an I/O controller 33, a USB port (not shown), and a PCI bus (not shown), and transmits a booting order which is transmitted from the CPU 1 through the north bridge 2, to a BIOS ROM 4.

Also, according to the present invention, the computer further comprises a temperature sensor 7 detecting an internal temperature of the CPU 1, a power control circuit 10 cutting off power of the power supply part 6 in the case that the internal temperature of the CPU 1 detected by the temperature sensor 7 exceeds a predetermined reference temperature, a CPU cooling part 30 cooling the CPU 1 on the basis of the internal temperature of the CPU 1 detected by the temperature sensor 7, and a selection part 50 allowing the temperature sensor 7 to be selectively connected to one of the power control circuit 10 and the CPU cooling part 30. Herein, a BIOS stored in the BIOS ROM 4 controls the selection part 50 so that the temperature sensor 7 can be connected to the CPU cooling part 30 during performing a POST.

The temperature sensor 7 detects the internal temperature generated in the CPU 1 when a computer system is operated. Herein, the temperature sensor 7 can comprise a thermal diode. The thermal diode has a characteristic that a resistance of the thermal diode is changed corresponding to the internal temperature of the CPU 1. Thus, different voltages are generated according to changes of the internal temperature of the CPU 1. In an embodiment according to the present invention, the temperature sensor 7 is embedded in the CPU 1 by way of an example; however, embodiments of the present invention are not limited to the temperature sensor being embedded in the CPU 1, as long as the temperature sensor can detect the temperature of the CPU 1.

The power control circuit 10 comprises a monitoring circuit 11 generating a power controlling signal when the internal temperature of the CPU 1 detected by the temperature sensor 7 exceeds a monitoring reference temperature, and a power cut-off circuit 13 cutting off power of the power supply part 6 when the power controlling signal of the monitoring circuit 11 is inputted.

The monitoring circuit 11 generates the power controlling signal when the internal temperature of the CPU 1 detected by the temperature sensor 7 exceeds the monitoring reference temperature. The power controlling signal is transmitted to the power cut-off circuit 13. That is, if the internal temperature of the CPU 1 is increased, the resistance of the temperature sensor 7 is correspondingly changed, a voltage transmitted to the monitoring circuit 11 through the temperature sensor 7 is changed, and the monitoring circuit 11 determines whether the internal temperature of the CPU 1 detected by the temperature sensor 7 exceeds the monitoring reference temperature according to a change of the voltage.

The power cut-off circuit 13 cuts off power of the power supply part 6 when the power controlling signal is inputted from the monitoring circuit 11. Thus, power supplied to the CPU 1 is cut off when the internal temperature of the CPU 1 exceeds the monitoring reference temperature, which indicates that the CPU 1 is heated and that misoperation and breakdown of the CPU 1 by increase of the internal temperature of the CPU 1 needs to be prevented.

The selection part 50 comprises a first switching circuit 51 connecting or disconnecting the temperature sensor 7 with the power control circuit 10, a second switching circuit 55 connecting or disconnecting the temperature sensor 7 with the CPU cooling part 30, and a switching control circuit 58 controlling the first switching circuit 51 and the second switching circuit 55 so that one of the first switching circuit 51 and the second switching circuit 55 is selectively turned on.

The first switching circuit 51 is turned on/off by control of the switching control circuit 58, to thereby connect and disconnect the temperature sensor 7 with the power control circuit 10. When the first switching circuit 51 is turned on, the power control circuit 10 is connected with the temperature sensor 7 and receives the information of the internal temperature of the CPU 1 detected by the temperature sensor 7. Herein, the power control circuit 10 cuts off power supplied from the power supply part 6 when the internal temperature of the CPU 1 detected by the temperature sensor 7 exceeds the monitoring reference temperature. On the contrary, when the first switching circuit 51 is turned off, the power control circuit 10 is disconnected from the temperature sensor 7 and does not receive the information of the internal temperature of the CPU 1 detected by the temperature sensor 7. Herein, the first switching circuit 51 may be provided not only to connect and disconnect the temperature sensor 7 with the monitoring circuit 11, but also simultaneously connect and disconnect the monitoring circuit 11 with the power cut-off circuit 13.

The second switching circuit 55 is turned on/off by control of the switching control circuit 58, and thus connects and disconnects the temperature sensor 7 with the CPU cooling part 30. When the second switching circuit 55 is turned on, the CPU cooling part 30 and the temperature sensor 7 are connected to each other. Accordingly, the CPU cooling part 30 receives the information of the internal temperature of the CPU 1 detected by the temperature sensor 7 and controls cooling of the CPU 1.

The switching control circuit 58 controls the first switching circuit 51 and the second switching circuit 55 so that one of the first switching circuit 51 and the second switching circuit 55 is selectively turned on. Herein, the switching control circuit 58 turns on the first switching circuit 51 and turns off the second switching circuit 55 when power is initially supplied. Thus, after an initial power is supplied, the power control circuit 10 is connected with the temperature sensor 7 and power supplied from the power supply part 6 is cut off when the internal temperature of the CPU 1 exceeds the monitoring reference temperature.

In the meanwhile, the BIOS stored in the BIOS ROM 4 makes the switching control circuit 58 turn off the first switching circuit 51 and turn on the second switching circuit 55 during performing the POST. Herein, it is preferable that the BIOS controls the switching control circuit 58 so that the first switching circuit 51 is turned off and the second switching circuit 55 is turned on after completion of the POST. Thus, the temperature sensor 7 and the CPU cooling part 30 are connected to each other. The CPU cooling part 30 receives the information of the internal temperature of the CPU 1 that is detected by the temperature sensor 7, and cools the CPU 1 on the basis of the information thereof.

The CPU cooling part 30 comprises a cooling fan 31 cooling the CPU 1, a fan driving part 32 (for example, a motor) driving the cooling fan 31, and a fan driving controller 33 controlling the fan driving part 32 on the basis of the internal temperature of the CPU 1 that is detected by the temperature sensor 7.

The fan-driving controller 33 may be the I/O controller 33 controlling an input/output of the computer. When the second switching circuit 55 is on, the I/O controller 33 receives the information of the internal temperature of the CPU 1 from the temperature sensor 7 and controls rotation speed (RPM) of the fan driving part 32 on the basis of the internal temperature of the CPU 1, to thereby control the cooling of the CPU 1.

In the meanwhile, when the second switching circuit 55 is on, when it is analyzed that the internal temperature of the CPU 1 detected by the temperature sensor 7 exceeds a predetermined BIOS reference temperature, the I/O controller 33 can control the power cut-off circuit 13 to cut off power supplied from the power supply part 6. That is, the I/O controller 33 is connected with the power cut-off circuit 13, compares the internal temperature of the CPU 1 detected by the temperature sensor 7 with the predetermined BIOS reference temperature when the second switching circuit 55 is on, and controls the power cut-off circuit 13 to cut off the power supplied from the power supply part 6 if the internal temperature of the CPU 1 detected by the temperature sensor 7 exceeds the predetermined BIOS reference temperature. Like this, when the second switching circuit 55 is on and the first switching circuit 51 is off, when the monitoring circuit 11 of the power control circuit 10 does not monitor the internal temperature of the CPU 1, the I/O controller 33 cuts off the power supplied from the power supply part 6 on the basis of the internal temperature of the CPU 1 detected by the temperature sensor 7. Thus, the misoperation and the breakdown of the CPU 1 by the increase of the internal temperature can be prevented. Herein, the information of the predetermined BIOS reference temperature can be stored in the BIOS ROM 4. Further, the predetermined BIOS reference temperature can be the same as the predetermined monitoring reference temperature.

Hereinafter, the computer according to embodiments of the present invention will be described with reference to FIGS. 2 through 4. As described above, the computer according to the present invention comprises the power control circuit 10 cutting off the power supplied from the power supply part 6 in the case that the internal temperature of the CPU 1 detected by the temperature sensor 7 exceeds the predetermined monitoring reference temperature, the CPU cooling part 30 cooling the CPU 1 on the basis of the internal temperature of the CPU 1 detected by the temperature sensor 7, and the selection part 50 making the temperature sensor 7 selectively connected to one of the power control circuit 10 and the CPU cooling part 30.

Figure 2:
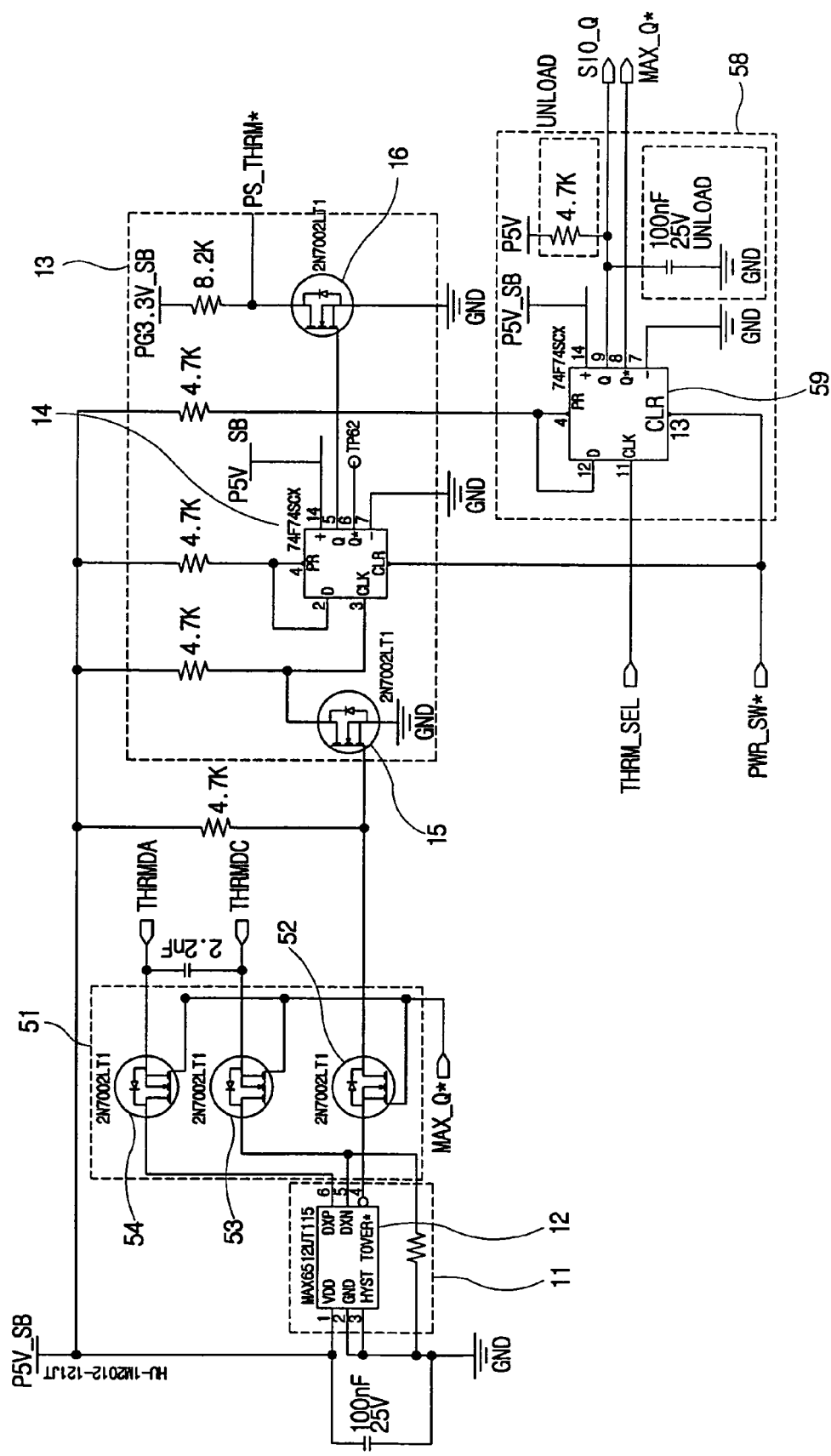
FIGS. 2 through 4 are views of circuits illustrating the control block diagram of FIG. 1.
Figure 3:
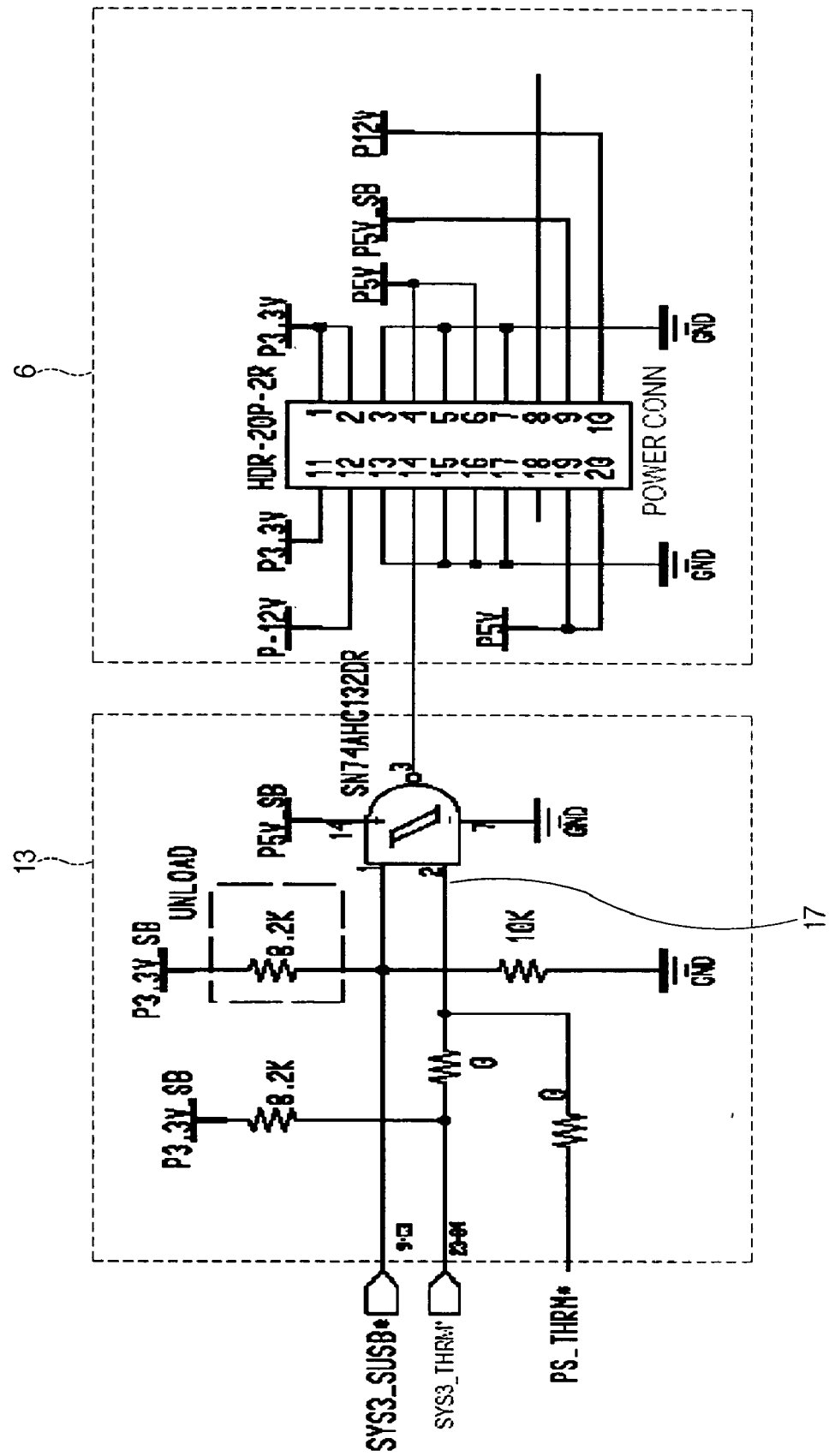

With reference to FIGS. 2 and 3, the monitoring circuit 11 of the power control circuit 10 comprises an integrated circuit (IC) having a plurality of input pins and output pins. In the embodiment of the present invention, a MAX6512 chipset 12 is used for the IC by way of an example. Herein, the MAX6512 chipset 12 comprises a DXP pin, a DXN pin, and a TOVER* pin. The DXP pin and the DXN pin are connected to the temperature sensor 7. The TOVER* pin is connected to the power cut-off circuit 13. Herein, the MAX6512 12 receives a THRMDC signal and a THRMDA signal through the DXN pin and the DXP pin from the temperature sensor 7.

The power cut-off circuit 13 of the power control circuit 10 has two field effect transistors (hereinafter, "FET"), and a D flip-flop 14 (hereinafter, referring to a D flip-flop of the power cut-off circuit 13 as a "first D flip-flop"). Herein, the two FETs comprise an FET 15 (hereinafter, "first FET") whose gate is connected to the TOVER* pin of the MAX6512 12, and an FET 16 (hereinafter, "second FET") whose gate is connected to a Q pin of the D flip-flop 14. Also, the power cut-off circuit 13 of the power control circuit 10 comprises a NAND gate 17 outputting the power controlling signal by logical operation of a PS_THRM* signal outputted from a drain pin of the second FET 16 and a SYS3_SUSB* signal transmitted from the South Bridge 3. Herein, the SYS3_SUSB* signal transmitted from the South Bridge 3 is a primary power controlling signal of the power supply part 6. The power controlling signal outputted from the NAND gate 17 is provided to the power supply part 6 and controls power of the power supply part 6. Herein, the drain pin of the first FET 15 is connected to a CLK pin of a first D flip-flop 14. Source pins of the first FET 15 and the second FET 16 are grounded.

The first switching circuit 51 of the selection part 50 has three FETs 52–54. A source pin of the FET 52 and each drain pin of the FETs 53 and 54 are respectively connected to the TOVER* pin, the DXN pin, and the DXP pin of the monitoring circuit 11. Hereinafter, to describe the present invention in detail, an FET 52 having a source pin connected to the TOVER* pin of the MAX6512 12 of the monitoring circuit 11 is referred to as a "third FET", an FET 53 having a drain pin connected to the DXN pin of the MAX6512 12 of the monitoring circuit 11 is referred to as a "fourth FET", and an FET 54 having a drain pin connected to the DXP pin of the MAX6512 12 of the monitoring circuit 11 is referred to as a "fifth FET".

Respective gates of the third FET 52, the fourth FET 53, and the fifth FET 54 receive a MAX_Q* signal from the switching control circuit 58 (to be described later). A drain pin of the third FET 52 is connected to a gate of the first FET 15 of the power cut-off circuit 13, and each source pin of the fourth and fifth FETs 53 and 54 is connected to the temperature sensor 7. Herein, the fourth FET 53 regulates the THRMDC signal inputted from the temperature sensor 7 to the DXN pin of the MAX6512 12. The fifth FET 54 regulates the THRMDA signal outputted from the DXP pin of the MAX6512 12 to the temperature sensor 7.

Figure 4:
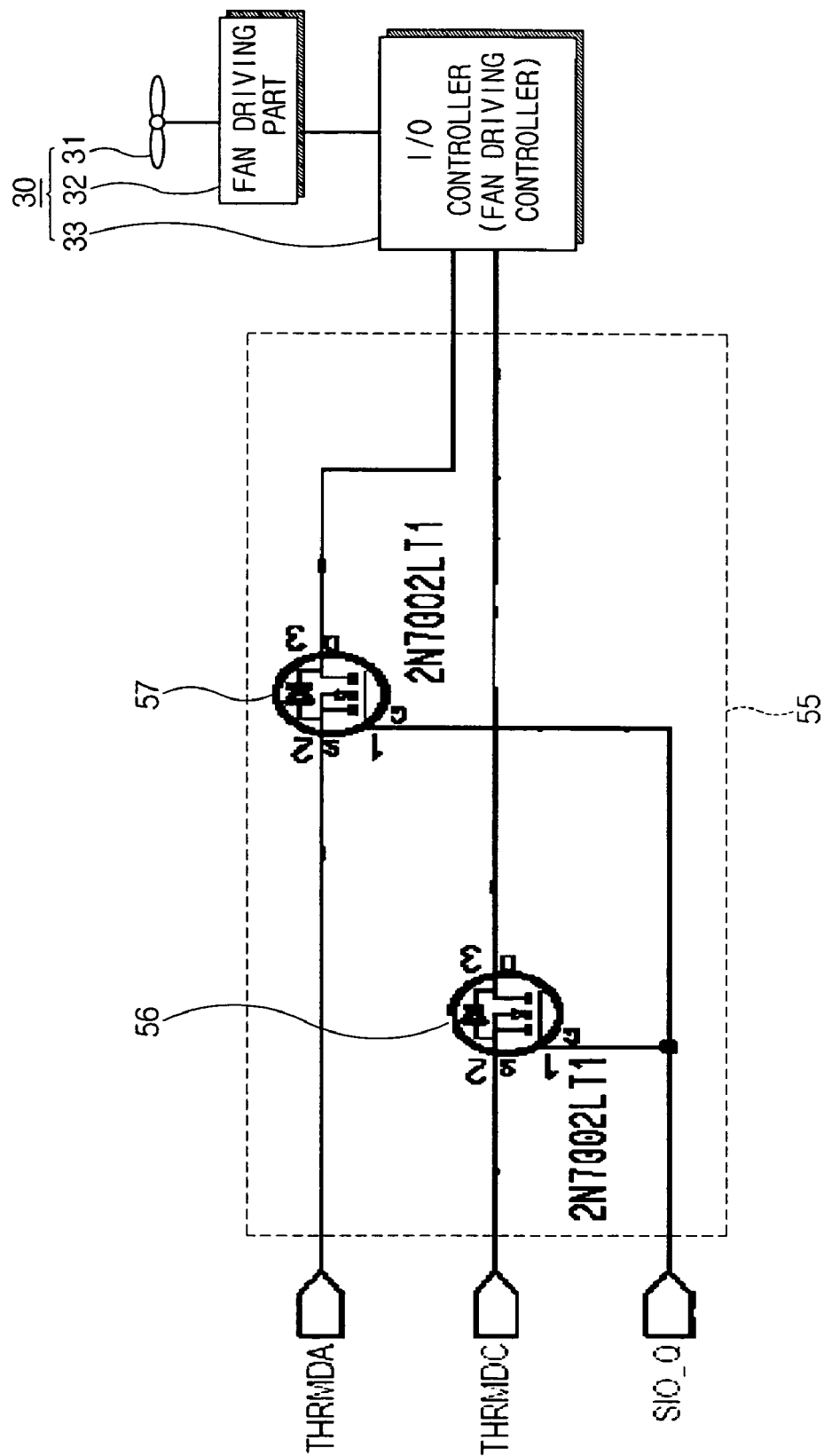

The second switching circuit 55 of the selection part 50, as shown in FIG. 4, has two FETs 56 and 57 (hereinafter, the "sixth FET", and the "seventh FET", respectively). Respective gates of the sixth FET 56 and the seventh FET 57 receives an SIO_Q signal from the switching control circuit 58, each source pin thereof is connected to the temperature sensor 7, and each drain pin thereof is connected to the I/O controller 33, so that flow of the THRMDA signal and the THRMDC signal communicated between the temperature sensor 7 and the I/O controller 33 is regulated.

The switching control circuit 58 of the selection part 50, as shown in FIG. 2, comprises a D flip-flop 59 (hereinafter, "second D flip-flop") respectively transmitting the MAX_Q* signal and the SIO_Q signal to the first switching circuit 51 and the second switching circuit 55 on the basis of a THRM_SEL signal inputted through the South Bridge 3 from the BIOS and a PWR_SW* signal inputted from a power button. That is, the CLK pin of the second D flip-flop 59 receives the THRM_SEL signal through the South Bridge 3 from the BIOS and a CLR pin thereof receives the PWR_SW* signal from the power button by being connected to the power button. A Q pin of the second D flip-flop 59 is connected to each gate of the sixth FET 56 and the seventh FET 57 of the second switching circuit 55 and transmits the SIO_Q signal to each gate of the sixth FET 56 and the seventh FET 57. A Q* pin of the second D flip-flop 59 is connected to each gate of the third FET 52, the fourth FET 53 and the fifth FET 54 of the first switching circuit 51 and transmits the MAX_Q* signal to each gate of the third FET 52, the fourth FET 53 and the fifth FET 54.

Figure 5:
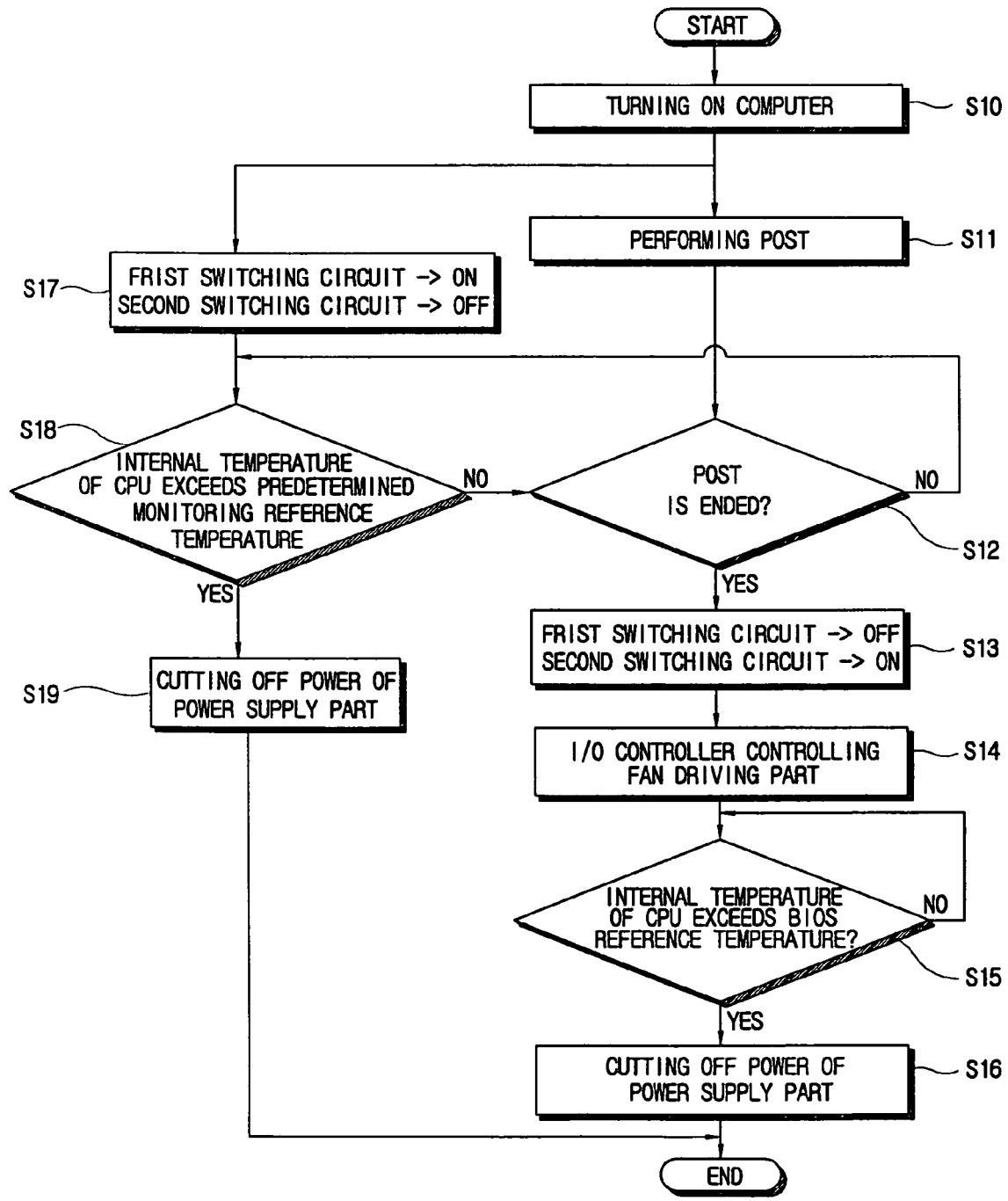
FIG. 5 is a control flow diagram according to the present invention.

Hereinafter, with the configuration of circuits shown in FIGS. 2 through 4, a control process of the computer according to the present invention will be described with reference to FIG. 5.

At first, if a power button (not shown) is turned on (S10), the CPU 1 reads the BIOS from the BIOS ROM 4 and performs the POST (S11). Herein, if an initial power is supplied, the PWR_SW* signal transmitted from the power button becomes "low" and thus the second D flip-flop 59 of the switching control circuit 58 is cleared. Herein, the signal of the PR pin of the second D flip-flop 59 is maintained "low", and the THRM_SEL signal inputted to the CLK pin thereof is maintained "low". Herein, the SIO_Q signal outputted from the Q pin becomes "low", and the MAX_Q* signal outputted from the Q* pin becomes "high". A low-state SIO_Q signal outputted from the Q pin of the second D flip-flop 59 turns off the second switching circuit 55 and a high-state MAX_Q* signal outputted from the Q* pin of the second D flip-flop 59 turns on the first switching circuit 51 (S17). Thus, when power is initially supplied, the temperature sensor 7 is connected to the power control circuit 10, and the I/O controller 33 of the CPU cooling part 30 is not connected to the temperature sensor 7.

A high-state MAX_Q* signal turns on the first switching circuit 51. That is, the high-state MAX_Q* signal is inputted to the gates of the third FET 52, the fourth FET 53, and the fifth FET 54 of the first switching circuit 51, so that the THRMDA signal and THRMDC signal can flow between the temperature sensor 7 and the DXP pin and the DXN pin of the MAX6512 chipset 12. Accordingly, the MAX6512 12 receives the information of the internal temperature of the CPU 1, and thus determines whether the internal temperature of the CPU 1 exceeds the predetermined monitoring reference temperature (S18). Herein, the MAX6512 12 changes the TOVER* signal, which is an output signal thereof, to "low", and outputs the TOVER* signal to the power cut-off circuit 13 when it is determined that the internal temperature of the CPU 1 exceeds the predetermined monitoring reference temperature.

A low-state TOVER* signal outputted from the MAX6512 12 changes a signal inputted into the CLK pin of the D flip-flop 14 connected with the drain pin of the first FET 15 to "high" by turning off the first FET 15 of the power cut-off circuit 13. Herein, a signal of each signal pin of the second D flip-flop 59, that is, the CLR pin, a D pin and the PR pin, is maintained "high", and a signal outputted from the Q pin thereof is changed to "high" and thus turns on the second FET 16. If the second FET 16 is turned on, the PS_THRM* signal outputted from the drain pin of the second FET 16 is changed to "low" and inputted to the NAND gate 17 shown in FIG. 3. Accordingly, an output signal of the NAND gate 17 is changed to "high" by conjunction of the SYS3_SUSB* signal and the PS_THRM* signal. Herein, a high-state signal outputted from the NAND gate 17 cuts off power supplied from the power supply part 6 (S19). Thus, power supplied from the power supply part 6 is cut off, when it is detected that the internal temperature of the CPU 1 exceeds the predetermined monitoring reference temperature by the MAX6512 12, to thereby prevent the misoperation and the breakdown of the CPU 1 by a high temperature. Herein, while the POST is being performed by the BIOS, as described above, the information of the internal temperature of the CPU 1 is transmitted to the MAX6512 12, to thereby prevent the breakdown or the misoperation of the CPU 1.

In the interim, when the POST by the BIOS is ended (S12), the BIOS changes the THRM_SEL signal inputted into the CLK pin of the second D flip-flop 59 of the switching control circuit 58 through the South Bridge 3 to "high". Herein, each signal of the CLR pin, the PR pin and the D pin of the second D flip-flop 59 is maintained "high", the SIO_Q signal outputted from the Q pin is changed to "high", and the MAX_Q* signal outputted from the Q* pin is changed to "low". Herein, the MAX_Q* signal changed to "low" turns off the first switching circuit 51 (S13). Thus, the monitoring circuit 11 has a connection with neither the temperature sensor 7 nor the power cut-off circuit 13.

The SIO_Q signal changed to "high" is transmitted to each gate of the sixth FET 56 and the seventh FET 57 of the second switching circuit 55, and turns on the sixth FET 56 and the seventh FET 57, to thereby allow the second switching circuit 55 to be turned on (S13). Accordingly, the temperature sensor 7 and the I/O controller 33 are connected to each other. Thus, the I/O controller 33 can appropriately control the cooling of the CPU 1 according to the internal temperature of the CPU 1 by controlling the rotation speed of the fan driving part 32 on the basis of the internal temperature of the CPU 1 transmitted from the temperature sensor 7 (S14).

In the interim, in a state that the second switching circuit 55 is turned on, the I/O controller 33 transmits a low-state SYS3_THRM* signal to the NAND gate 17 of the power cut-off circuit 13 in the case that the internal temperature of the CPU 1 exceeds the BIOS reference temperature stored in the BIOS ROM 4 (S15). Herein, an output signal of the NAND gate 17 is changed to "high" by the conjunction of the SYS3_THRM* signal and the SYS3_SUSB* signal. Thus, power supplied from the power supply part 6 is cut off, so that the CPU 1 can be prevented from being misoperated and broken down by the increase of the internal temperature of the CPU 1 by the I/O controller 33 after the completion of the POST.

Like this, one of the power control circuit 10 and the CPU cooling part 30 selectively uses the information of the internal temperature of the CPU 1 detected by the temperature sensor 7 by providing the temperature sensor 7 detecting the internal temperature of the CPU 1, the power control circuit 10 cutting off power supplied from the power supply part 6 in the case that the internal temperature of the CPU 1 detected by the temperature sensor 7 exceeds the predetermined reference temperature, the CPU cooling part 30 cooling the CPU 1 on the basis of the internal temperature of the CPU 1 detected by the temperature sensor 7, and the selection part 50 allowing the temperature sensor 7 to be selectively connected to one of the power control circuit 10 and the CPU cooling part 30.

As described above, according to the present invention, provided is a computer system and a control method thereof allowing one of a power control circuit thereof and a CPU cooling part thereof to selectively use information of an internal temperature of a CPU detected by a temperature sensor.

The hardware included in the system may include memories, processors, and/or Application Specific Integrated Circuits ("ASICs"). Such memory may include a machine-readable medium on which is stored a set of instructions (i.e., software) embodying any one, or all, of the methodologies described herein. Software can reside, completely or at least partially, within this memory and/or within the processor and/or ASICs. For the purposes of this specification, the term "machine-readable medium" shall be taken to include any mechanism that provides (i.e., stores and/or transmits) information in a form readable by a machine (e.g., a computer). For example, a machine-readable medium includes read only memory ("ROM"), random access memory ("RAM"), magnetic disk storage media, optical storage media, flash memory devices, electrical, optical, acoustical, or other form of propagated signals (e.g., carrier waves, infrared signals, digital signals, etc.), etc.

Although a few embodiments of the present invention have been shown and described, it will be appreciated by those skilled in the art that changes may be made in these embodiments without departing from the principles and spirit of the present invention, the scope of which is defined in the appended claims and their equivalents.

What is claimed is:

1. A computer system having a CPU, a BIOS ROM to store a BIOS to perform a POST, and a power supply part to supply power to the CPU and the BIOS ROM, comprising:
    a temperature sensor to detect an internal temperature of the CPU;
    a power control circuit to cut off the power supplied from the power supply part when the internal temperature of the CPU detected by the temperature sensor exceeds a predetermined monitoring reference temperature;
    a CPU cooling part to cool the CPU according to the internal temperature of the CPU detected by the temperature sensor; and
    a selection part to selectively connect the temperature sensor to one of the power control circuit and the CPU cooling part,
    wherein the temperature sensor is connected to the power control circuit in an initial power supply, and wherein the BIOS that is stored in the BIOS ROM controls the selection part so that the temperature sensor is connectable to the CPU cooling part during the performing of the POST.

2. The computer system according to claim 1, wherein the power control circuit comprises:
    a monitoring circuit to generate a predetermined power controlling signal when the internal temperature of the CPU that is detected by the temperature sensor exceeds the predetermined monitoring reference temperature; and
    a power cut-off circuit to cut off the power of the power supply part when the predetermined power controlling signal is inputted from the monitoring circuit.

3. The computer system of claim 1, wherein the temperature sensor is a thermal diode, and wherein the resistance of the thermal diode is changed corresponding to the internal temperature of the CPU.

4. The computer system of claim 1, wherein the temperature sensor is embedded within the CPU.

5. The computer system according to claim 2, wherein the selection part comprises:
    a first switching circuit to be turned on/off so that the temperature sensor and the power control circuit are connected and/or disconnected;
    a second switching circuit to be turned on/off so that the temperature sensor and the CPU cooling part are connected and/or disconnected; and
    a switching control circuit to selectively turn on one of the first switching circuit and the second switching circuit.

6. The computer system according to claim 5, wherein the switching control circuit turns on the first switching circuit and turns off the second switching circuit so that the temperature sensor is connected to the power control circuit when power is initially supplied.

7. The computer system of claim 5, wherein the first switching circuit is turned on/off so that the monitoring circuit and the power cut-off circuit are connected and/or disconnected.

8. The computer system according to claim 6, wherein the BIOS that is stored in the BIOS ROM controls the switching control circuit so that the first switching circuit is turned off and the second switching circuit is turned on, to thereby allow the temperature sensor and the CPU cooling part to be connected to each other during the POST.

9. The computer system according to claim 6, wherein the BIOS that is stored in the BIOS ROM controls the switching control circuit so that the first switching circuit is turned off and the second switching circuit is turned on, to thereby allow the temperature sensor and the CPU cooling part to be connected to each other when the POST is ended.

10. The computer system according to claim 8, wherein the CPU cooling part comprises:
    a cooling fan to cool the CPU;
    a fan driving part to drive the cooling fan; and
    a fan driving controller to control the fan driving part according to the internal temperature of the CPU that is detected by the temperature sensor.

11. The computer system according to claim 10, wherein the fan driving controller comprises an I/O controller to control an input/output of the computer system.

12. The computer system of claim 10, wherein the fan driving part is a motor.

13. The computer system according to claim 11, wherein when the second switching circuit is on, the I/O controller controls the power cut-off circuit to cut off the power supplied from the power supply part when the internal temperature of the CPU detected by the temperature sensor exceeds a predetermined BIOS reference temperature.

14. The computer system of claim 11, wherein when the second switching part is on, the I/O controller receives the internal temperature of the CPU from the temperature sensor and controls a rotation speed of the fan driving part according to the internal temperature.

15. The computer system according to claim 13, wherein the BIOS ROM stores information of the predetermined BIOS reference temperature.

16. A control method of a computer system having a CPU, a BIOS ROM storing a BIOS to perform a POST, a power supply part supplying power to the CPU and the BIOS ROM, a power control circuit to cut off the power supplied from the power supply part, and a CPU cooling part cooling the CPU, comprising:
    detecting an internal temperature of the CPU;
    inputting information of the internal temperature of the CPU to the power control circuit in an initial power supply; and
    cutting off the information of the internal temperature of the CPU inputted to the power control circuit, and inputting the information of the internal temperature of the CPU to the CPU cooling part.

17. The control method of the computer system according to claim 16, wherein the inputting the information of the internal temperature of the CPU to the power control circuit comprises:
    allowing the power control circuit to cut off the power supplied from the power supply part when the internal temperature of the CPU exceeds a predetermined monitoring reference temperature.

18. The control method of the computer system according to claim 16, wherein the cutting off the information of the internal temperature of the CPU inputted to the power control circuit, and the inputting the information of the internal temperature of the CPU to the CPU cooling part are performed when the POST is ended.

19. The control method of the computer system according to claim 18, wherein the power control circuit comprises a monitoring circuit generating a predetermined power controlling signal when the internal temperature of the CPU detected by the temperature sensor exceeds the predetermined monitoring reference temperature, and a power cut-off circuit to cut off the power from the power supply part when the power controlling signal is inputted from the monitoring circuit, and wherein the CPU cooling part comprises a cooling fan cooling the CPU, a fan driving part driving the cooling fan, and a fan driving controller controlling the fan driving part according to a detected internal temperature of the CPU, the control method further comprising:

allowing the fan driving controller to control the power cut-off circuit to cut off the power supplied from the power supply part when the detected internal temperature of the CPU exceeds a predetermined BIOS reference temperature after information of the detected internal temperature of the CPU is inputted to the CPU cooling part.

20. The control method of the computer system according to claim 19, wherein the predetermined BIOS reference temperature is stored in the BIOS ROM.

21. A computer system having a CPU, a BIOS ROM to store a BIOS to perform a POST, and a power supply part to supply power to the CPU and the BIOS ROM, comprising:

a temperature sensor to detect an internal temperature of the CPU;

a power control circuit to cut off the power supplied from the power supply part when the internal temperature of the CPU that is detected by the temperature sensor exceeds a predetermined monitoring reference temperature;

a CPU cooling part to cool the CPU according to the internal temperature of the CPU that is detected by the temperature sensor; and a selection part to selectively connect the temperature sensor to one of the power control circuit and the CPU cooling part.

22. The computer system according to claim 21, wherein the power control circuit comprises:

a monitoring circuit to generate a predetermined power controlling signal when the internal temperature of the CPU that is detected by the temperature sensor exceeds the predetermined monitoring reference temperature; and a power cut-off circuit to cut off the power from the power supply part when the predetermined power controlling signal is inputted from the monitoring circuit.

23. The computer system according to claim 22, wherein the selection part comprises:

a first switching circuit to be turned on/off so that the temperature sensor and the power control circuit are connected and/or disconnected;

a second switching circuit to be turned on/off so that the temperature sensor and the CPU cooling part are connected and/or disconnected; and a switching control circuit to selectively turn on one of the first switching circuit and the second switching circuit.

24. The computer system according to claim 23, wherein the switching control circuit turns on the first switching circuit and turns off the second switching circuit so that the temperature sensor is connected to the power control circuit when power is initially supplied.

25. The computer system according to claim 24, wherein the BIOS stored in the BIOS ROM controls the switching control circuit so that the first switching circuit can be turned off and the second switching circuit is turned on, to thereby allow the temperature sensor and the CPU cooling part to be connected to each other during performing the POST.

* * * * *